United States Patent Office 3,346,652
Patented Oct. 10, 1967

3,346,652
FLUORINATION OF HALOOLEFINS
Donald Pilipovich, Canoga Park, Calif., assignor to
North American Aviation, Inc.
No Drawing. Filed Dec. 24, 1962, Ser. No. 248,178
8 Claims. (Cl. 260—653)

This invention relates to fluorination of halo-olefins.

The introduction of fluorine into organic compounds, either by addition or substitution, has been accomplished heretofore with the use of various reactants including fluorine, hydrogen fluoride, interhalogen fluorides, and metallic fluorides. In the reactions of fluorine and the interhalogen fluorides with unsaturated compounds, the high heats of activation and (or) reaction cause considerable bond ruptures, polymers are formed, and the products are complex mixtures of substances many of which are not related structurally to the starting material. In the reactions with metal fluorides, e.g., $CoF_3$ and $AgF_2$, both substitution and addition reactions occur.

In the case of a reaction of trichloroethylene ($C_2Cl_3H$) with cobalt trifluoride, for example, the following resultants, among others, in the relative amounts indicated are produced: $CClF_2$—$CClF_2$ (8 percent), $CF_3CH_2Cl$ (3 percent), $CClF_2CHClF$ (4 percent), $CCl_2FCHF_2$ (1 percent), $CClF_2CCl_2F$ (26 percent), and $CCl_2FCHFCl$ (10 percent). It is seen that only 10 percent of the product consists of the addition of fluorine in the double bond and that the others of the above-mentioned resultants are formed through substitution reactions.

The use of lead tetrafluoride for addition of fluorine to a double bond is another instance of fluorination by a metal fluoride. For that reaction there are no reports of yields of 1:1 adducts in excess of 60 percent, and yields as high as about 60 percent are obtained only in cases of highly halogenated systems. In the $PbF_4$-fluorinations of compound having a double bond and an abundance of hydrogen, substitution takes place readily. The case of substitution occurring with the use of lead tetrafluoride is illustrated by the reaction of $C_2H_5F$ and $PbF_4$ at 100° C., producing $CH_3CHF_2$ and $CH_3CF_3$. Also, exchange with chlorine may occur from the use of lead tetrafluoride as is illustrated by the conversion of $CF_3CCl_2CCl_3$ to $CF_3CCl_2CFCl_2$.

For the fluorination process of this invention the halo-olefins used as starting materials are of the type having an ethylenic linkage in which at least one carbon atom of the linkage is a terminal carbon atom of the halo-olefin. More particularly, the halo-olefins are of the group consisting of compounds of the following formulae:

$$R'R''C{:}CR''_2 \text{ and } R'R''C{:}CR''{-}CR''{:}CR''_2$$

wherein, in each of the foregoing formulae, for each ethylenic linkage at least one R attached directly thereto is a halogen atom; R' represents a member of the group consisting of hydrogen, halogen and saturated and unsaturated halogenated hydrocarbons having from 1 to 12 carbon atoms, the R″ represents a member of the group consisting of hydrogen and halogen. Some examples of compounds of the first formula are: trichloroethylene; 1-bromo-2-ethylethylene; 2-chloro-4 iodo-butene-1; perfluorovinylcyclohexane, and 2-fluoro - 3 - methyl-3(3-alkyl) cyclohexyl-ethylene. Some examples of compounds of the second formula are: perfluoro 1,3 butadiene; 1,1-dichloro-2,3, difluoroisoprene, and 1,2-difluoro-4 chloro-1,3 pentadiene.

In the process of this invention the halo-olefin is reacted with trifluoramine oxide and boron trifluoride to produce a fluorocarbon which is the addition product of the starting halo-olefin by two fluorine atoms. Another resultant of the reactions of this invention is nitrosonium tetrafluoroborate ($NOBF_4$).

In the case of fluorination of a halo-olefin of the above-mentioned general formula, $R'R''C{:}CR''_2$, two fluorine atoms are added across the double bond, producing a compound of the formula:

$$R'R''FC{-}CFR''_2$$

wherein the Rs represent the same groups respectively as in the general formula for the halo-olefin reactant. In the case of fluorination, according to this invention, of a halo-olefin of the conjugated-double-bond type and of the above-mentioned general formula, $$R'R''C{:}CR''{-}CR''{:}CR''_2$$

an additive compound is produced through saturation of the numbers 1 and 4 carbons, and a double bond is produced between the numbers 2 and 3 carbons, the product being of the formula:

$$R'R''FC{-}CR''{:}CR''{-}CR''_2F$$

wherein the Rs represent the same groups respectively as in the general formula for the conjugated halo-olefin reactant.

The reactions of this invention occur when the $NF_3O$, $BF_3$, and the halo-olefin to be fluorinated are placed in contact with each other in condensed phase. Mixtures of $NF_3O$ and $BF_3$ form loose molecular complexes when condensed, the dissociation pressure of the solid being one atmosphere at about —45° C. With an increase in pressure, however, a significant amount of the complex is present at higher temperatures, and the limiting temperature for use of the mixture, according to this invention, is that point at which the system ($NF_3O+BF_3$) or $NF_3O{:}BF_3$ decomposes. A preferred procedure for the process of this invention is to form a solid complex of $NF_3O$ and $BF_3$ by condensation of a mixture of $NF_3O$ and $BF_3$ gases in a reaction vessel and then to melt the halo-olefin to be fluorinated upon the solid complex.

Separation of the fluorinated resultant from the reaction mixture may be accomplished by filtering out the $NOBF_4$ and by distillation, fractional condensation, or gas chromatography.

The process of this invention is advantageous in that the configuration of the starting halo-olefin is retained in the fluorocarbon product whereby control is had over the nature of the product. In reactions with olefins having halogen substituents other than fluorine, such other halogens are not displaced by fluorine from the $NF_3O$ and $BF_3$. No hydrogen substitution occurs. The fluorination reactions of this invention are usually immediate. The fluorine-supplying reactants used in the process of this invention are non-corrosive to glass whereby the use of glass apparatus is permitted by this invention. Also, high yields of the predeterminable fluorocarbon are obtained, and in many cases the reactions are quantitative.

The reactant, trifluoramine oxide, has a melting point of —161.5°±1.0° C., and a boiling point of about —89° C. calculated from vapor pressure data. It is thermally stable up to about 300° C. at autogenous pressure. It may be prepared by reacting difluoramine with chlorine trifluoride and an oxygenated halogen compound as disclosed in patent application Ser. No. 142,459, filed Sept. 29, 1961.

With respect to concentrations of reactants, the use of stoichiometrical proportions of the reactants suggests itself; but from a purely qualitative standpoint, distinct from quantitative considerations, the fact of fluorination of the halo-olefins exists irrespective of the relative concentrations of the reactants. Relative molar concentrations of the reactants varying from 1 to 25 times on the one hand for the $BF_3$ and the halo-olefin with respect to the $NF_3O$, to from 1 to 25 times on the other hand for the $NF_3O$ with respect to the $BF_3$ or to the halo-olefin are practicable concentrations for the process of this invention; but inasmuch as separation operations are more efficient when stoichiometrical proportions have been used, stoichiometrical proportions may be considered as being the preferred relative concentrations for this invention.

Another facet of the matter of concentrations of reactants is that of including inert constituents in the mixture of reactants. The $NF_3O$ and $BF_3$ mixture may be dissolved in a suitable solvent without affecting the fluorination reactions of this invention when considered solely from a qualitative standpoint. As examples of suitable solvents for use in the process of this invention, hexafluoroacetone ($CF_3COCF_3$) and the perfluoro alkyl nitriles ($C_nF_{2n+1}C{\equiv}N$) have demonstrated solvent action on $NF_3O$—$BF_3$. Relative concentrations of solvent to solute of from 1 to 25 times one with respect to the others may be considered as being preferred. As to other inert constituents in the mixture of reactants, e.g. nitrogen and helium, this is a parameter which, because of mass action principles, affects the reactions of this invention quantitatively but not qualitatively.

The reactions between the halo-olefins and $NF_3O+BF_3$ are usually complete in a very short period of time namely of the order of from one second to a half hour. Fluorination occurs immediately upon mixing the reactants together. When the reactions of this invention are conducted employing a solvent, the $NF_3O$ may be bubbled into a solution of $BF_3$ and the halo-olefin; alternatively $NF_3O$ and $BF_3$ in a solvent may be treated with the halo-olefin to effect the fluorination reaction.

Sundry uses of fluorocarbons are well known. They are relatively inert and are usable as solvents and lubricants in situation where other solvents and lubricants would be attacked by strong oxidizing agents or by high temperatures. The fluorocarbons have electrical properties which make them ideal transformer liquids. The perfluorocarbons serve as plasticizers for the perfluoroethylene polymers. Products of the process of this invention are valuable intermediates in the preparation of more highly fluorinated organic compounds. Still further uses of the products formed by the process of this invention are as intermediates in the preparation of fluoroplastics, refrigerants and aerosol propellants.

The process of this invention is hereinafter illustrated in greater detail by description in connection with the following specific examples of the practice of it:

*Example I*

Trifluoramine oxide and boron trifluoride in the molar ratio of 1:1 were condensed in a Pyrex ampoule by cooling at a cryogenic temperature below their boiling points. Trifluoroethylene ($CF_2{:}CFH$), in the molar ratio of 1:1 with respect to the amount of condensed trifluoramine oxide, was condensed upon the mixture of trifluoramine oxide and boron trifluoride and the ampoule was allowed to stand for about one hour with the contents of the ampoule being maintained in condensed phase. The ampoule was then allowed to warm up to ambient temperature and its contents was fractionated in a vacuum line of a series of cryogenic traps. The contents of one of the traps was found to be monohydroperfluorethane ($CF_3CF_2H$), identified by its mass cracking pattern and by comparison of its infrared spectrum with a published spectrum. The yield of $CF_3CF_2H$, in a molar ratio with respect to the amount of the condensed $NF_3O$ was found to be 1:1; i.e. 100 percent.

*Example II*

The same apparatus and the same supplies of reactants as were used in Example I were used again, but in this Example II, $NF_3O$ and $C_2F_3H$ in the molar ratio of 1:2 were condensed together and thereafter $BF_3$, in the molar ratio of 1:3 with respect to the amount of condensed $NF_3O$, was condensed upon the mixture of $NF_3O$ and $C_2F_3H$. The yield of $CF_3CF_2H$ with respect to $NF_3O$ was found to be 100 percent.

*Example III*

The same apparatus and the same supplies of reactants as were used in Example I were used again, but this Example III, $BF_3$ and $C_2F_3H$ were condensed together and thereafter $NF_3O$ was condensed upon the mixture of $BF_3$ and $C_2F_3H$. The molar relationship of amounts of $BF_3$, $C_2F_3H$ and $NF_3O$ were 4:3:1. The yield of $CF_3CF_2H$ with respect to $NF_3O$ was found to be 100 percent.

The following table sets forth the yields of still further examples of halo-olefins when fluorinated according to the process of this invention.

| Halo-Olefin | Product | Yield in Percent |
|---|---|---|
| $CF_2{:}CF_2$ | $C_2F_6$ | 40 |
| $CF_2{:}CFCl$ | $C_2F_5Cl$ | 90 |
| $CF_2{:}CFBr$ | $C_2F_5Br$ | 90 |
| $CF_2{:}CFI$ | $C_2F_5I$ | 99.9 |
| $CF_2{:}CCl_2$ | $CF_2CCl_2F$ | 90 |
| $CF_2{:}CH_2$ | $CF_3CH_2F$ | 100 |
| $CFCl{:}CFCl$ | $CF_2ClCF_2Cl$ | 100 |
| $CH_2{:}CHF$ | $CH_2FCHF_2$ | 12 |
| $CF_2{:}CFCH{:}CF_2$ | $CF_3CF{:}CFCF_3$ | 100 |
| $CH_2BrCHBrCF{:}CF_2$ | $CH_2BrCHBrCF_2CF_3$ | 100 |

The yields set forth in the above table represent mole percent based on the stoichiometric amount of $NF_3O$ present in a 1:1 ratio with respect to the amount of the halo olefin.

It will be understood that it is intended to cover all changes and modifications of the examples of the invention herein chosen for the purpose of illustration which do not constitute departures from the spirit and scope of the invention.

Having described the invention what is claimed is:

1. A process for fluorinating a halo-olefin having an ethylenic linkage in which at least one carbon atom of the linkage is a terminal carbon atom of the halo-olefin, the process comprising reacting the olefin with trifluoramine oxide and boron trifluoride in condensed phase, whereby a fluorocarbon is produced which is a fluorine addition product of the olefin.

2. The process according to claim 1 wherein said halo-olefin is perfluorethylene.

3. The process according to claim 1 wherein said halo-olefin is trifluorethylene.

4. The process according to claim 1 wherein said halo-olefin is 1,3-perfluorobutadiene.

5. A process for fluorinating a halo-olefin having an ethylenic linkage in which at least one carbon atom of the linkage is a terminal carbon atom of the halo-olefin, the process comprising contacting the olefin with a solid complex consisting essentially of trifluoramine oxide and boron trifluoride whereby a fluorocarbon is produced which is the fluorine addition product of the olefin.

6. A process for fluorinating a halo-olefin of the group consisting of compounds of the following formulae:

$$R'R''C{:}CR''_2 \text{ and } R'R''C{:}CR''{-}CR''{:}CR''_2$$

wherein, in each of the foregoing formulae, for each ethylenic linkage at least one R attached directly thereto is a halogen; R' represents a member of the group consisting of hydrogen, halogen and saturated and saturated halogenated hydrocarbons having from 1 to 12 carbon atoms, and R'' represents a member of the group consisting of hydrogen and halogen, the process comprising reacting said halo-olefin with a mixture in condensed phase of trifluoramine oxide and boron trifluoride, whereby a fluorocarbon is produced which is a fluorine addition product of said halo-olefin.

7. A process for fluorinating a halo-olefin of the group consisting of compounds of the following formulae:

R'R"C:CR"₂ and R'R"C:CR":CR"₂ wherein, for each ethylenic linkage at least one R attached directly thereto is a halogen; R' represents a member of the group consisting of hydrogen, halogen and saturated and saturated halogenated hydrocarbons having from 1 to 12 carbon atoms, and R" represents a member of the group consisting of hydrogen and halogen, the process comprising reacting said halo-olefin with a solid complex consisting essentially of trifluoramine oxide and boron trifluoride, whereby a fluorocarbon is produced which is the fluorine addition product of the said halo-olefin by two fluorine atoms.

8. A process for fluorinating a halo-olefin having an ethylenic linkage in which at least one carbon atom of the linkage is a terminal carbon atom of the halo-olefin, the process comprising dissolving boron trifluoride and trifluoramine oxide in an inert solvent at a temperature below that at which substantial decomposition of the trifluoramine oxide takes place, condensing said halo-olefin upon the solution of boron trifluoride and trifluoramine oxide whereby a fluorocarbon is formed which is a fluorine addition product of the said olefin, and separating said fluorocarbon from said solution.

No references cited.

LEON ZITVER, *Primary Examiner.*

CARL D. QUARFORTH, *Examiner.*

D. HORWITZ, L. A. SEBASTIAN, *Assistant Examiners.*

UNITED STATES PATENT OFFICE

CERTIFICATE OF CORRECTION

Patent No. 3,346,652                October 10, 1967

Donald Pilipovich

It is hereby certified that error appears in the above numbered patent requiring correction and that the said Letters Patent should read as corrected below.

Column 4, in the table, first column, line 9 thereof, for "$CF_2:CFCH:CF_2$" read -- $CF_2:CFCF:CF_2$ --; same column 4, line 68, for "saturated", second occurrence, read -- unsaturated --; column 5, line 8, for "saturated" read -- unsaturated --.

Signed and sealed this 19th day of November 1968.

(SEAL)

Attest:

Edward M. Fletcher, Jr.                EDWARD J. BRENNER

Attesting Officer                     Commissioner of Patents